Dec. 25, 1928.
W. F. HUNDEMER
1,696,606
BOOSTER GREASE GUN AND METHOD OF GREASING BEARINGS
Filed June 1, 1925
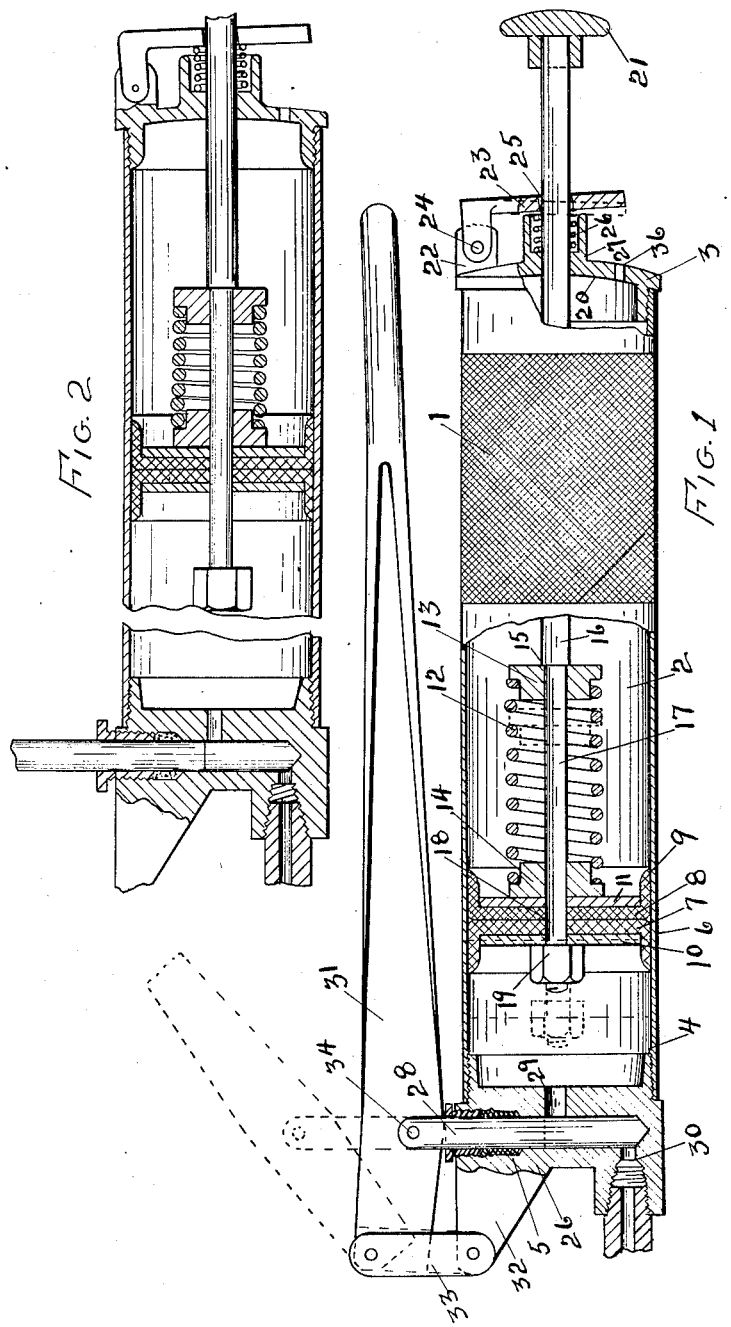
INVENTOR.
WALTER F. HUNDEMER
BY
ATTORNEYS.

Patented Dec. 25, 1928.

1,696,606

UNITED STATES PATENT OFFICE.

WALTER F. HUNDEMER, OF ALAMEDA, CALIFORNIA, ASSIGNOR TO GAT GUN LUBRICATING CORPORATION, OF OAKLAND, CALIFORNIA, A CORPORATION OF CALIFORNIA.

BOOSTER GREASE GUN AND METHOD OF GREASING BEARINGS.

Application filed June 1, 1925. Serial No. 33,998.

My invention is an improved booster grease gun and method of greasing bearings in which the grease gun functions as a storage receptacle for the grease and the booster pump forces the grease under high pressure through a conduit to a bearing, an object being to provide a grease gun and a booster pump therefor, to deliver grease at a bearing under sufficient pressure to force out the old grease and to supply the new.

In some respects my grease gun and booster pump is an improvement over application No. 556,393 for a grease gun filed April 25, 1922 by Albert T. Shere, and I may utilize therewith a high pressure grease conduit of my application No. 727,342 filed July 21, 1924.

The particular improvement of the grease gun over that of Shere above mentioned is in making provision for forming a better vacuum in the open end of the gun so that grease may be drawn in more readily on pulling the piston rod and also to make a better vacuum delivery when the booster pump is operated to have the piston and piston rod following up the grease as it is pumped out of the grease gun without any manual manipulation.

I also provide a positive acting locking means to engage the smooth piston rod, said locking means comprising a lever which is forced outward by a spring so that pumping operation under high pressure cannot force the piston backward into the cylinder of the grease gun.

My invention will be more readily understood from the following description and drawings in which:

Figure 1 is a longitudinal section partly in elevation of my grease gun with booster pump attached.

Figure 2 is a partial section showing the action of the spring forcing the grease into the booster pump in the initial operation of the pump.

Referring particularly to Figures 1 and 2 the grease gun designated generally by the numeral 1 has a cylinder 2 with a closed head 3 threaded thereon, cylindrical walls 6, and an open end 4 to which is attached the booster pump designated generally by the numeral 5 secured thereto by a screw threaded connection. The piston is formed by oppositely positioned piston cups 7 and 8 being placed in back-to-back relation and with the lips 9 of the cups extending in opposite directions. These lips are preferably rather long and flexible. The cups are held in position by a pair of plates 10 and 11 and the plates are pressed toward each other by the pressure of the spring 12 which is tensioned between thrust blocks 13 and 14, the block 13 engaging a shoulder 15 on the piston rod 16. The reduced end 17 of the piston rod slides through an aperture 18 in the piston cups and the plates 10 and 11, and has a nut 19 screw threaded on its end. It will thus be seen that the piston cups are held together by the pressure of the spring 12 on one face and of nut 19 on the other face, as shown in Figure 1, or by the pressure of spring 12 on one face of the body of the grease in the forward end of the gun on the other face, as shown in Figure 2. It will thus be seen that when the piston rod is pulled out to its fullest extent by the handle 21 and then pressed inwardly against the resistance of the grease, the piston cups are clamped tighter together than in the position shown in Figure 1.

The head 3 is provided with a pair of lugs 22 which carry a locking lever 23 swiveled on the pintle 24. This lever has an aperture 25, slightly larger than the smooth stem of the piston rod 16, which grips the rod and prevents its being drawn outwardly when in the full line position of Figure 1. This aperture also allows the rod to move in step by step as the grease is withdrawn from the grease gun as hereafter described. A spring 26 is mounted in the cup 27 on the grease gun head and bears against the locking lever 23 holding it in the position shown by full lines in Figure 1. This will lock the piston rod against outward movement. That is, it can not be pulled out by the handle 21 without pressing the lever in the position shown dotted in Figure 1, nor can the inward pressure on the piston force the piston and piston rod outwardly.

In Figure 2 the piston is shown after being drawn inwardly until the block 13 contacts with the head 3 and the piston rod is pressed in to initially compress the grease. After grease has been sucked into the grease gun by inserting the open end of the cylinder in a pot of grease and drawing out the piston rod the booster pump is attached to the cylinder by screwing it onto the open end 4 thereof. After the booster pump is properly attached the piston rod is forced inwardly, compressing the spring 12, which exerts a pressure on the piston and as the piston rod is locked the spring causes the filling of the bore of the booster pump after the plunger has been drawn upwardly.

The booster pump itself is constructed substantially the same as that shown in the Shere application above mentioned, and comprises a body portion 26, a transverse bore 27, a plunger 28 operable in said bore, the inlet 29 from the grease gun cylinder to the bore being substantially in a central position in the bore. The outlet 30 connects with any suitable type of conduit. The lever 31 is connected to the bracket 32 by a swiveling link 33 and to the plunger 28 by a pivoted pin 34.

The operation of the combined grease gun and booster pump is substantially as follows:

After the booster pump has been filled with grease as above described by the initial pressure of the spring forcing the piston inwardly or by manual manipulation of the piston rod by the handle 21, the operator may disregard the manual manipulation of the piston rod. The pumping of the booster pump by the lever 31 forces the grease out of the bore and into the conduit. On the upward stroke a vacuum is created in the lower end of the bore and the atmospheric pressure of the air entering through a breathing aperture 36 in the head of the grease gun forces the piston towards the open end of the cylinder and forces grease into the booster pump bore. As above described, the lock lever 23 allows the piston to move inwardly freely and prevents its moving outward, therefore, on the down stroke of the plunger as the grease in the bore of the booster pump is put under pressure it tends to shove the piston backward in the grease gun. This is resisted by the locking of the smooth stemmed piston rod by the locking lever.

If the plunger is designed to have a short stroke as shown in Figure 1 the grease will merely flow into the lower end of the bore and the initial movement of the plunger will close inlet 29, therefore the grease between the piston and the booster pump will not be subject to very great pressure. However, in some types of booster guns it is desirable to have a long stroke as indicated in Figure 2. In this case on the upward stroke of the plunger the grease is sucked into the bore below and above the inlet 29. Therefore, on the down stroke until the plunger closes the inlet 29 it tends to force the grease backward into the space between the piston and the booster pump. This compresses the grease very highly and locks the piston rod also more tightly so that after the grease in the grease gun has been properly compressed, substantially all the grease in the bore of the booster pump is forced into the jointed pipe 35.

An important feature of my invention is having the two piston cups 6 and 7 placed with the lips facing in opposite directions and having the cups back to back. Another important feature is having the piston cups backed by the two plates held together by the spring. This allows greater flexibility of the piston cups and tends to form a better vacuum both in drawing the grease into the cylinder and at the back of the piston when the grease is being pumped out. The piston cup 7 when grease is being drawn into the open end of the grease cup seals the cylinder and prevents air from entering thereby forming a vacuum at the front of the piston and drawing grease from an open container into the cylinder. When the pump is being operated the piston cup 8 is under atmospheric pressure of air and thereby presses tightly against the cylinder wall 6 and prevents the air passing to the front end of the piston. Thus in the pumping operation the piston follows the grease inward step by step and the atmospheric pressure and the inside of the booster is always in contact with the grease between the piston and the booster pump.

My mechanical method of greasing may be substantially described as follows:

By the insertion of the open end of the grease gun in the grease container and drawing upward of the piston rod the grease is sucked into the open end of the cylinder on account of the creation of a vacuum on the front of the piston. After sufficient grease has been introduced into the cylinder to fill it to the extent of movement of the piston, the booster pump is attached to the cylinder. The piston rod is shoved in to compress the spring and the plunger of the booster pump is then raised. The spring then forces the piston forwardly filling the booster pump. On the operation of the booster pump, backward movement of the piston is resisted by the locking of the piston rod by the locking lever 23. On the suction strokes a vacuum is created between the piston and the booster pump and draws or sucks grease from the cylinder into the booster pump, and due to the exterior pressure of the air on the inside of the piston, the piston is moved forward step by step as the grease is exhausted at each stroke of the booster pump.

Having described my invention, what I claim is:

In combination, a cylinder adapted to contain grease and having a booster pump associated with the front end thereof, a head on the rear end of the cylinder and provided with a breathing aperture, a rod extending slidably through said head into the cylinder, a piston slidable on said rod and comprising a pair of flexible cups in back-to-back relation, an abutment on said rod, a coiled spring having its ends bearing respectively on said abutment and on the piston so as to urge the latter forwardly, and a locking means for the rod associated with the rear end of the cylinder, said locking means being arranged to allow the rod to be pushed forwardly but to resist rearward movement of the rod, and comprising a lever having one end pivoted to said head, extending transversely thereof, and provided with an aperture which receives the piston rod, a spring urging the free end of said lever rearwardly, and a cup on said head housing said last mentioned spring.

In testimony whereof I affix my signature.

WALTER F. HUNDEMER.